United States Patent [19]

Nakagawa et al.

[11] Patent Number: 4,994,226
[45] Date of Patent: Feb. 19, 1991

[54] METHOD OF PRODUCING SYNTHETIC RESIN MADE ARTICLES HAVING POROUS ELASTIC MEMBER

[75] Inventors: Kazuhiko Nakagawa, Aichi; Yuji Wakayama, Nagoya; Shuji Nakata, Obu; Tadashi Shimizu, Nagoya, all of Japan

[73] Assignees: Nippondenso Co., Ltd.; Shimizu Industry Company, Ltd., both of Kariya, Japan

[21] Appl. No.: 397,336

[22] Filed: Aug. 23, 1989

Related U.S. Application Data

[63] Continuation of Ser. No. 123,522, Nov. 20, 1987, abandoned.

[30] Foreign Application Priority Data

Nov. 22, 1986 [JP] Japan .................................. 61-279245

[51] Int. Cl.$^5$ .................. B29C 45/14; B29C 45/16
[52] U.S. Cl. .................................... 264/261; 264/266; 264/263; 156/280
[58] Field of Search .............. 264/266, 261, 263, 46.4; 156/280

[56] References Cited

U.S. PATENT DOCUMENTS

| | | | |
|---|---|---|---|
| 3,493,643 | 2/1970 | Schwartzman | 264/266 |
| 3,807,146 | 4/1974 | Witkowski | 264/DIG. 48 X |
| 4,076,788 | 2/1978 | Ditto | 264/255 |
| 4,077,672 | 3/1978 | Clark, Jr. | 300/21 |
| 4,677,021 | 6/1987 | Kayakabe et al. | 428/306.6 |

FOREIGN PATENT DOCUMENTS

| | | |
|---|---|---|
| 15930 | 12/1971 | Australia . |
| 0187863 | 7/1986 | European Pat. Off. . |
| 3439101 | 5/1986 | Fed. Rep. of Germany . |
| 2614827 | 11/1988 | France . |
| 61-22914 | 1/1986 | Japan . |
| 62-24939 | 2/1986 | Japan . |

OTHER PUBLICATIONS

Patent Abstracts of Japan, vol. 10, No. 231 (M-506) (2287), Aug. 12, 1986; & JP A 61 063 445 01-04-1986.

Primary Examiner—Jay H. Woo
Assistant Examiner—Jeremiah F. Durkin, II
Attorney, Agent, or Firm—Cushman, Darby & Cushman

[57] ABSTRACT

A method of producing a synthetic resin made article having a porous elastic member, which is useful as an air duct opening/closing damper adaptable in air conditions for automobiles, including the steps of:
  placing a porous elastic member in position against the inner wall surface of one of the opposing segments of an injection mold splittable into two or more segments;
  closing said injection mold and compressing said porous elastic member by the clamping pressure;
  casting a synthetic molding resin along the surface of said porous elastic member; and
  applying a dwell pressure of a preset level for a prescribed period of time to the synthetic resin injected into said mold, and
a method of producing a synthetic resin made article having porous elastic members, which is useful as an air duct opening/closing damper adapted in air conditions for automobiles, which includes the steps of:
  placing the porous elastic members in position against the inner wall surfaces of each pair of opposing segments of an injection mold splittable into two or more segments;
  closing said injection mold and compressing said two porous elastic members by clamping pressure while the protuberant end of a gate provided in the mold is thrust into said elastic members so that said protuberant gate end will pass through one of the two porous elastic members and slightly wedge into the surface of the other elastic member;
  casting a synthetic molding resin along the opposing faces of said two porous elastic members; and
  applying a dwell pressure of preset level, for a prescribed period of time, to the synthetic resin injected into said mold.

8 Claims, 6 Drawing Sheets

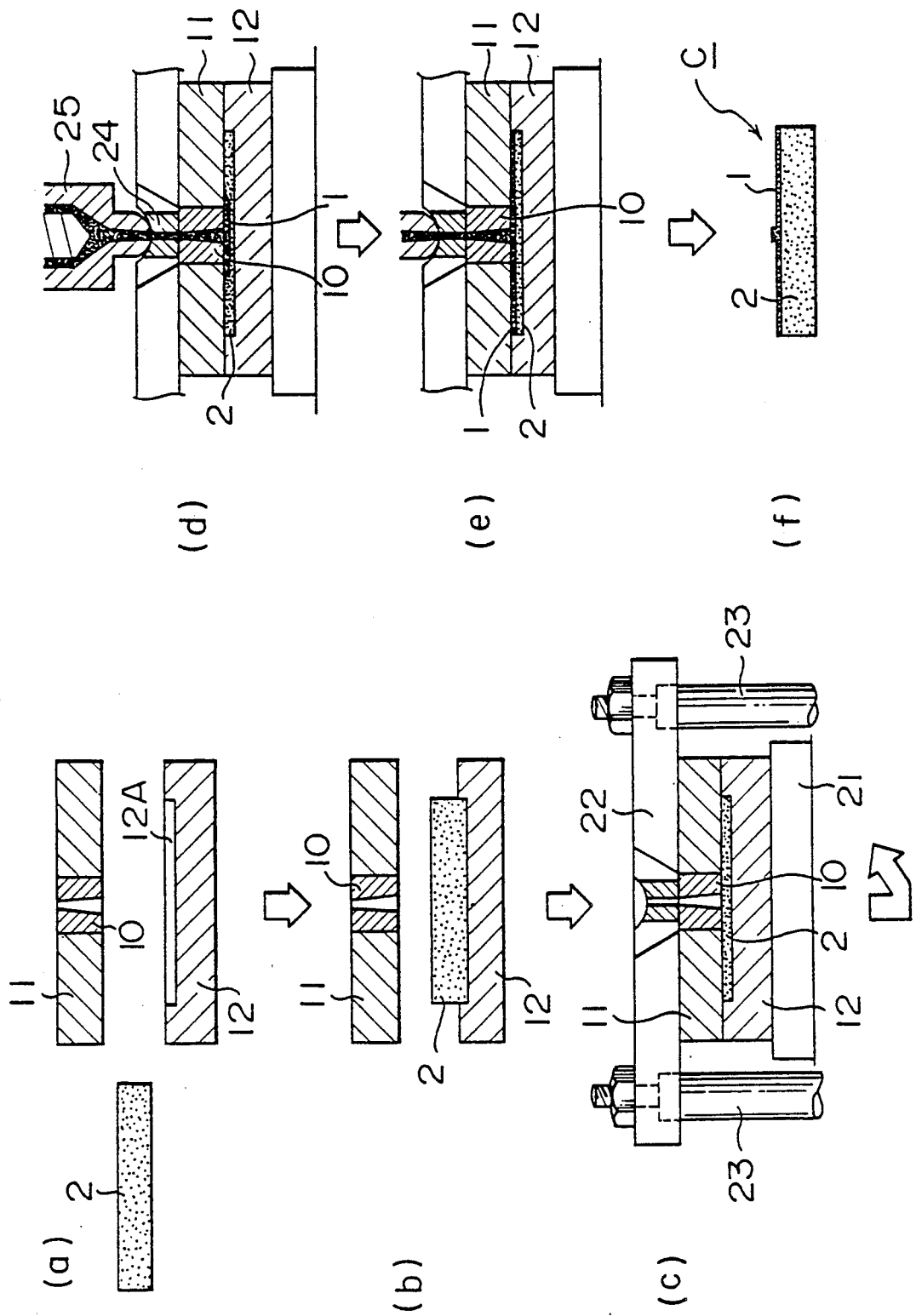

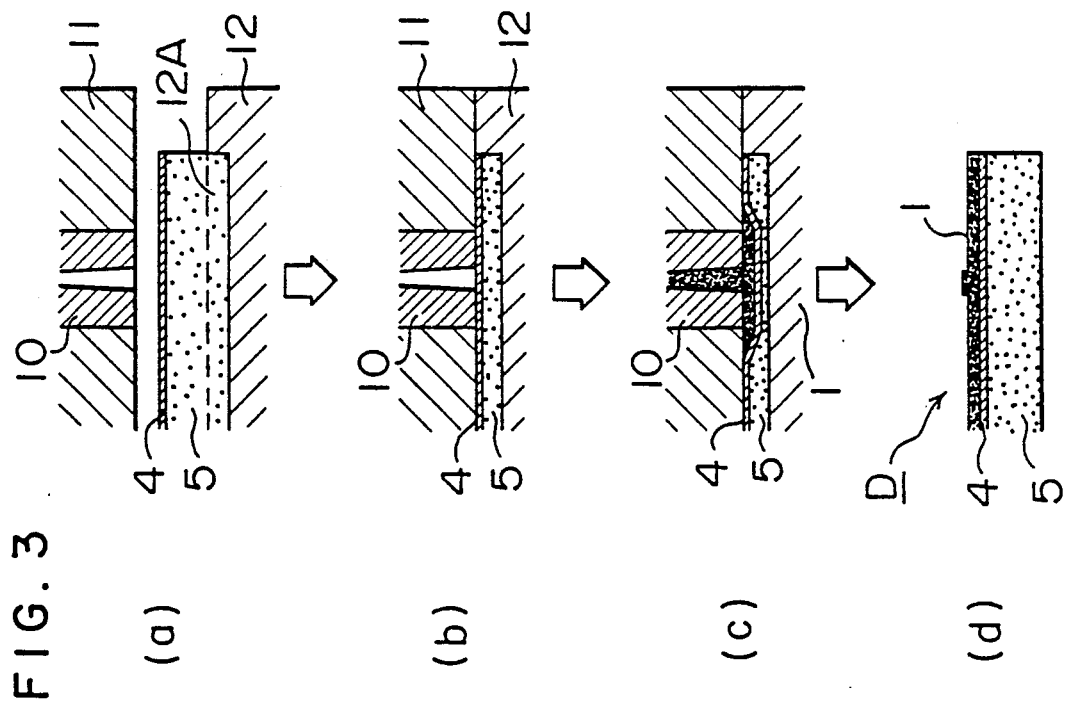
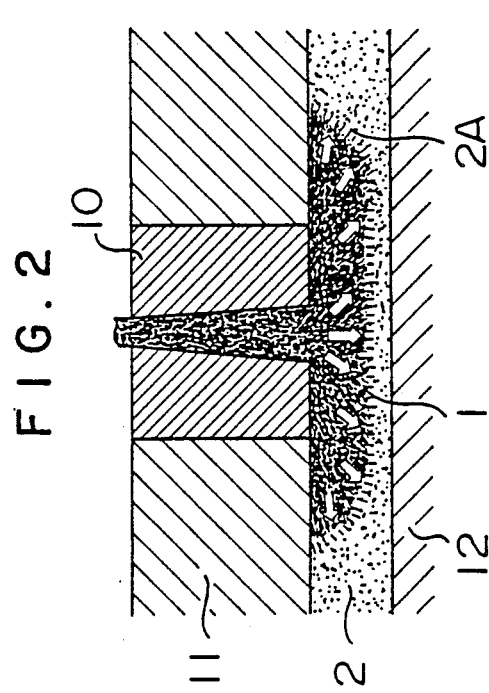
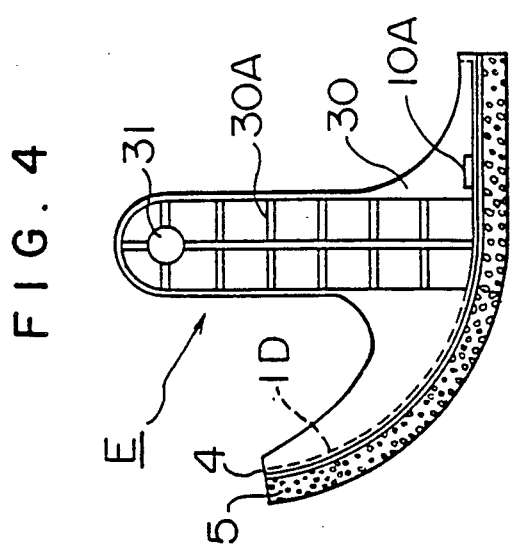

FIG. 6
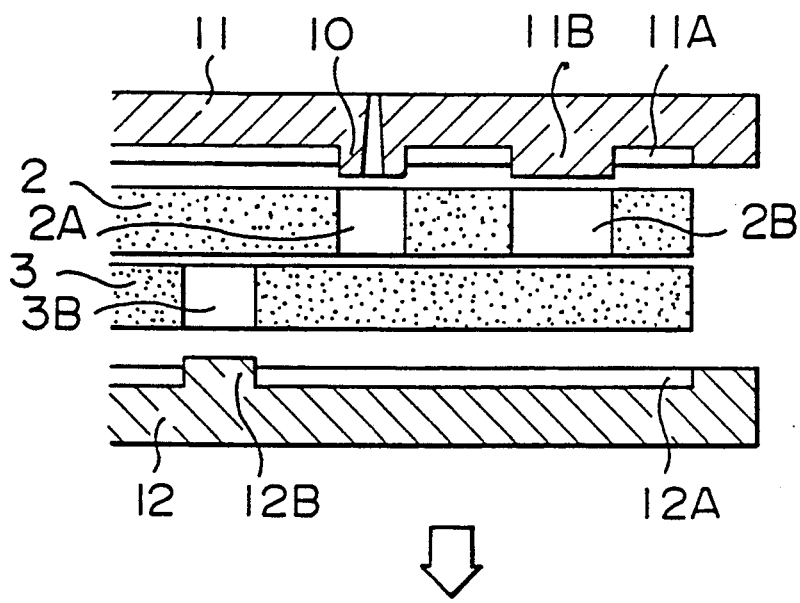
(a)
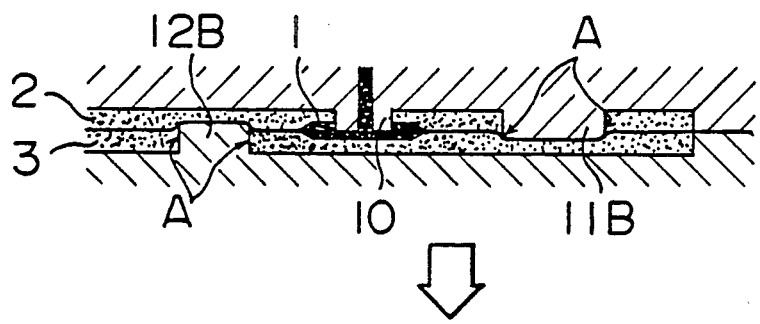
(b)
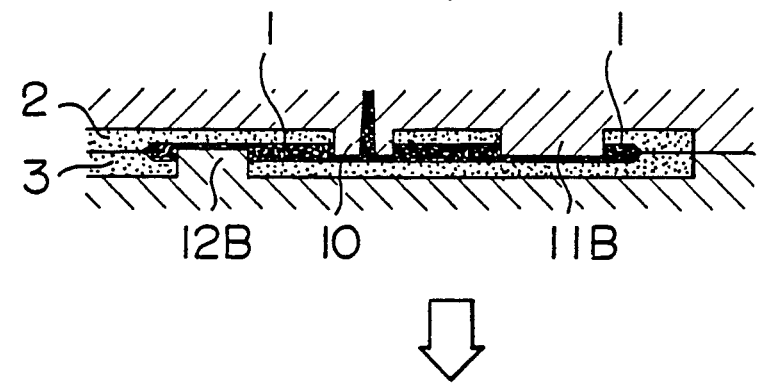
(c)
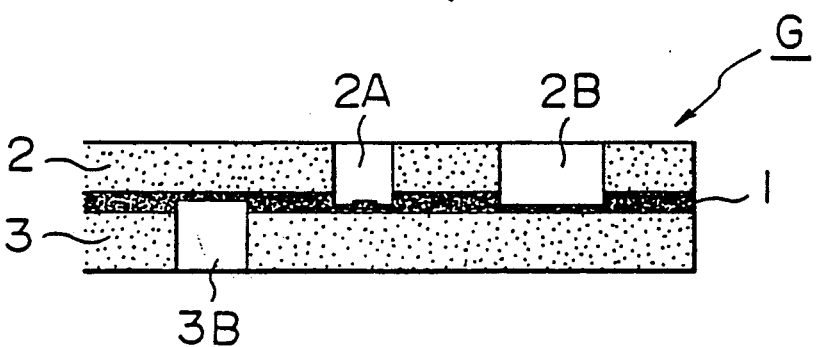
(d)

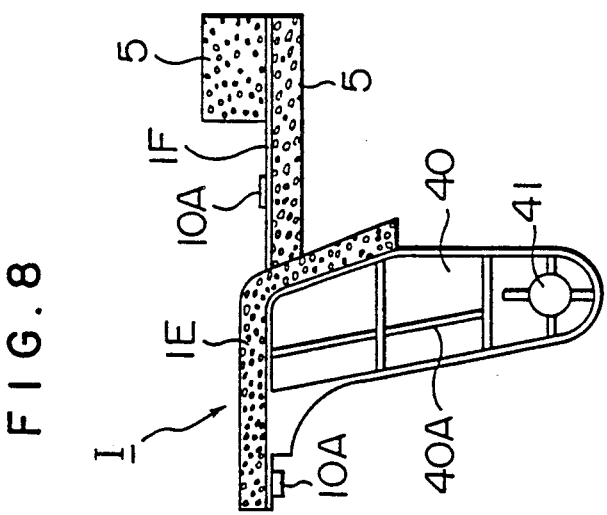
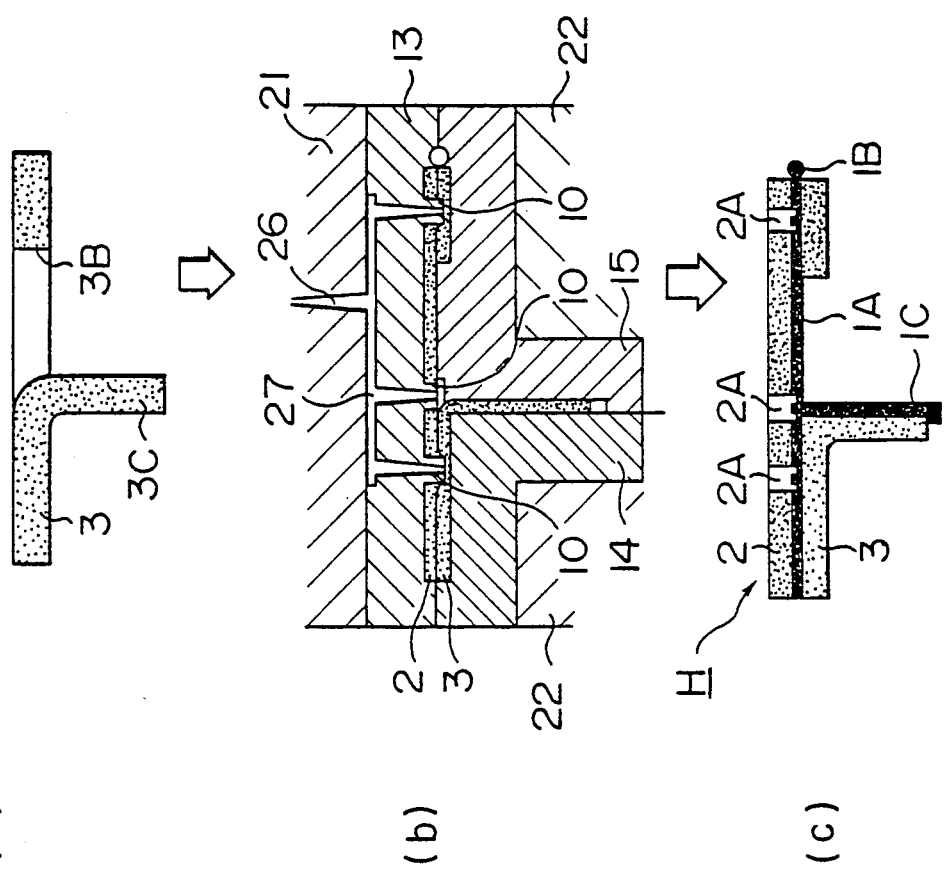

METHOD OF PRODUCING SYNTHETIC RESIN MADE ARTICLES HAVING POROUS ELASTIC MEMBER

This is a continuation of application Ser. No. 07/123,522, filed Nov. 20, 1987 which was abandoned upon the filing hereof.

BACKGROUND OF THE INVENTION

1. Field of the Invention

This invention relates to a method for efficiently producing the articles having a joint structure consisting of a synthetic resin portion and a portion made of a porous elastic member, such as an air duct opening/closing damper adaptable in air conditioners for automobiles, by using a synthetic resin injection molding machine.

2. Description of the Prior Art

In order to give airtight sealing properties and an impulsive sound absorbing capacity (when the damper is closed) to said hard synthetic resin-made damper body, the idea of efficiently incorporating a porous elastic member such as soft polyurethane foam sheet has been proposed in Japanese Patent Application Kokai (Laid-Open) No. 24939/86.

This patent application shows techniques for forming a laminate damper according to which a sort of packing member comprising a soft foam sheet having bonded to its surface a sheet for preventing the extruded molten resin from permeation into said foam sheet is prepared, and a molten synthetic resin layer is laminated on the surface of said packing member to a desired thickness by using a resin extruder, followed by stamping molding to form an integral laminate. Also disclosed in this patent application is a sandwich structure comprising packing members laminated on both sides of a synthetic resin layer.

Said prior art techniques contribute to the simplification of the manufacturing process in that bonding of packing members is accomplished coincidentally with molding of the synthetic resin-made damper body by making use of the bonding properties of molten resin.

On the other hand, this technique still involves several problems to be solved such as mentioned below:

(a) The time required for the manufacturing is too long because of a series of steps involving stamping after extrusion of a molten synthetic resin onto the surface of packing member.

(b) Although it is possible to make a planar laminate structure, it is difficult to obtain an article having a three-dimensional configuration.

(c) Adhesive force between the soft foam sheet and the resin permeation preventive sheet made of paper or cloth tends to vary from product to product, and also the bonding strength between packing member and resin molding may prove unsatisfactory.

The present invention has for its object to provide an injection molding method for integral molding of a porous elastic member and a synthetic resin, which method is capable of substantially eliminating said problems of the prior art.

SUMMARY OF THE INVENTION

In order to attain said object, the present invention provides, in an aspect thereof (first invention), a method of producing synthetic resin-made articles having a porous elastic member, comprising the steps of: placing a porous elastic member in position against the inner wall surface of one of the opposing segments or splits of an injection mold splittable into two or segments; closing said injection mold and compressing said porous elastic member by clamping pressure; casting a synthetic molding resin along the surface of said porous elastic member while adjusting the injection pressure stepwise, in at least two steps, in such a way that the peak value thereof won't exceed 250 kg/cm$^2$; and applying, for a predetermined period of time, a dwell pressure of a preset level not exceeding 500 kg/cm$^2$ to the synthetic resin injected into said mold. The invention also provide, in another aspect thereof (second invention), a method of producing said synthetic resin-made articles comprising the steps of: placing the porous elastic members in position against the inner wall surfaces of each pair of opposing segments of an injection mold splittable into two or more segments; closing said injection mold and compressing said two porous elastic members by clamping pressure while the protuberant end of a gate provided in the mold is thrust into said elastic members so that said protuberant gate end will pass through one of said two porous elastic members and slightly wedge into the surface of the other; casting a synthetic molding resin along the opposing surfaces of said two porous elastic members while adjusting the injection pressure stepwise, in at least two steps, in such a way that the peak value thereof won't exceed 250 kg/cm$^2$; and applying, for a prescribed period of time, a dwell pressure of a preset level not exceeding 500 kg/cm$^2$ to the synthetic resin injected into said mold.

BRIEF DESCRIPTION OF THE DRAWINGS

FIGS. 1, 3 and 4 are diagrammatic illustrations of the first, second and third embodiments of the invention, illustrating the manufacturing process according to the first invention of this application as it was applied to the manufacture of an air duct opening/closing damper to be incorporated in an air conditioner for automobiles.

FIG. 2 is a partial enlarged illustration of a step in the process of FIG. 1.

FIGS. 5 to 8 are diagrammatic illustrations of the fourth to seventh embodiments of the invention, illustrating the manufacturing process according to the second invention of this application.

Figure 5:
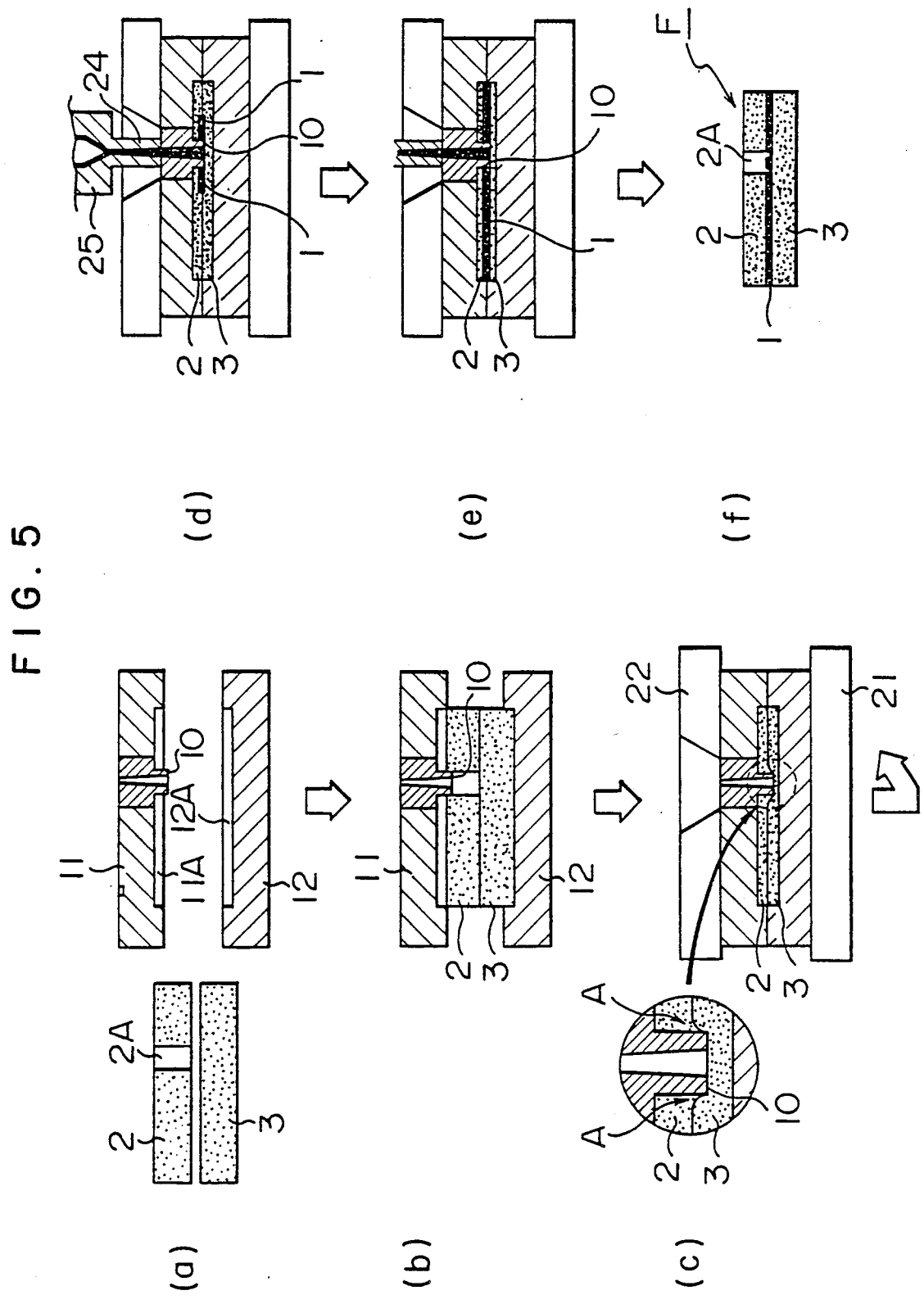

In the first invention, a porous elastic member (hereinafter referred to as foam sheet) is set against the inner wall surface of one of the opposedly positioned splits or segments of a split injection mold and then the mold is clamped to thereby make compact the texture of the foam sheet. Then a molten synthetic resin is injected first under a low injection pressure. As the foam sheet is further compressed by the injected resin pressure, the degree of compaction of said foam sheet is raised accordingly while the resin begins to flow along the foam surface by forming an injection space. When this stage is reached, the injection pressure is adjusted stepwise to a relatively high second level. This allows smooth flow of the resin while preventing the foam sheet from being sifted on receiving a large injection pressure or suffering from other troubles such as turned up at its edge or caught up into the flow of resin, and thus the resin is rightly injected into and fills the mold. The injected synthetic resin slightly penetrates into the porous surface portion of the foam sheet and is solidified in this state, so that the foam sheet is strongly bonded to the surface of the injection molded synthetic resin.

Then, by using the conventional injection molding technology, the injection pressure is further raised and kept for a predetermined period of time and then the mold is cooled. This can ensure the required strength of each part of the molded article.

When the molded article is drawn out of the mold after cooling, the compresed foam sheet restores its state before compression.

In the second invention, the molten resin is injected to the interface of the two foam sheets placed one on the other in a compressed state in the mold, as opposed to the first invention in which the molten resin is injected into the space between the inner wall surface of the mold and the surface of the foam sheet. In the second invention, therefore, the resin flow might be retarded due to the low rigidity of the interface and the increase of flow resistance. In view of this, the second invention incorporates a specific gate design such that the end portion of the gate will be slightly wedged into the surface of one of the two foam sheets so as to form in the other foam sheet, surrounding the end portion of the gate, a compression reducing zone where the compressive force by the clamping pressure is lessened.

Owing to this measure, the resin extruded from the gate warily under an initial low injection pressure can make its way while easily pushing aside the foam sheet placed around the gate. Thus, when a "foothold" was set for allowing the molten resin to flow on smoothly along the entire casting area, the injection pressure is now raised up stepwise to a relatively high level. This enables smooth progress of the filling of molten resin in the space between the facing surfaces of the two foam sheets, thus forming a synthetic resin layer having an almost uniform thickness corresponding to the thickness of foam sheets, depending upon the degree of their compression and injection pressure.

In the process of this second invention, as in the case of the first invention, there takes place no shift or deformation of foam sheets in the molten resin injection step, and the foam sheets are bonded by themselves to the surface of the injection molded synthetic resin surface. Also, the foam sheets after drawn out of the mold can substantially restore the thickness before compression.

According to the process of the first invention, the formation of a synthetic resin molding by injection molding and bonding of a porous elastic member such as foam plate to the surface of said molding can be accomplished simultaneously in an injection mold, so that it is possible to perfectly dispense with the separate step of molding by use of an adhesive in the conventional process.

Also, since the injected resin is cooled and solidified with a part of the resin permeated into the surface texture of the porous elastic member under the injection pressure, an amazingly high bonding strength is afforded.

Further, it is possible to obtain integral injection-molded articles having complicated three-dimensional configurations unobtainable with the conventional stamping molding method, and in addition to that, a sufficiently high productivity is realized.

According to the second invention, in addition to the effect of the first invention described above, it becomes possible to smoothly inject the synthetic resin in between two compressed foam sheets placed one on the other in the mold and to produce simply and quickly the synthetic resin-made molded articles having said foam sheets strongly bonded to both sides of the injection-molded resin layer.

DESCRIPTION OF THE PREFERRED EMBODIMENTS

The structure of the present invention will be described more minutely below by referring to the examples illustrated in the accompanying drawings.

In the drawings, FIG. 1 shows a process for producing an air duct opening/closing damper adaptable in an air conditioner for automobiles according to the first embodiment of the present invention (first invention).

The damper C, illustrated sectionally in FIG. 1(*f*), is of a structure in which a foam sheet 2 such as a soft polyurethane foam is bonded as a porous elastic member to the back side of the damper body 1 made of a hard synthetic resin plate.

The main steps for making such damper C comprise cutting out a foam sheet of required dimensions from a blank and trimming it, forcing this foam sheet into an injection mold in a compressed state, and injecting the molten synthetic resin into the space between said foam plate in a compressed sheet and the inner wall surface of the mold, letting the resin spread over the entirety of said space.

In this embodiment, a polypropylene resin blended with 40% by weight of mica powder as filler was used as hard synthetic resin 1 for injection molding. Used as foam sheet 2 was a soft polyurethane foam sheet cut out from a blank so as to have dimensions of 150 mm in length, 100 mm in width and 9 mm in thickness. The material of this foam sheet was polyester type polyurethane, and the foam had a foaming rate of 30 times and an average cell size of about 500μ.

The injection mold shown in FIG. 1(*a*) consists of a upper die 11 and a lower die 12, the latter having a cavity 12A of 2.5 mm in depth and equal to foam sheet 2 in plane area. A direct gate 10 is incorporated in the upper die 11.

FIG. 1(*b*) illustrates the step of fitting foam sheet 2 into said cavity 12A of the lower die 12.

The split injection mold (consisting of upper die 11 and lower die 12) is then held between a fixed platen 21 and a movable platen 22 as shown in FIG. 1(*c*) and clamped by a ram 23, whereby the foam sheet 2 is perfectly pressed into the cavity 12A and compressed to about 28% of its original thickness.

This is followed by the synthetic resin injection step shown in FIG. 1(*d*). In this step, the mica-blended polypropylene resin, which has been melted and plasticized by being heated to about 220° C. in an injection cylinder 25, is injected toward the gate 10 through a nozzle 24 under a pressure of about 100 kg/cm$^2$. The injected resin pushes aside the foam sheet placed confronting the end face of the gate 10, makes its way along the end face of said gate 10 and then begins to flow toward the peripheral area of the gate 10 while spreading out the interface between the inner wall surface of the upper die 11 and the foam sheet 2.

FIG. 2 is a partial enlarged view of said step (d) for illustrating the proceeding of this step. The molten resin 1 injected from the gate 10 exerts a compressive force to the foam sheet 2 as shown by white arrows in the drawing, whereby the foam sheet 2 which has already been compressed considerably by the clamping pressure is more strongly compressed as shown in the drawing. Consequently, the porous and flexible structure of the foam sheet before compression is strikingly changed into a very compact texture. Therefore, the molten resin which has a considerable degree of fluidity can not easily permeate into the foam sheet 2. However, since there still remains the porous structure microscopically, the molten resin slightly permeates into the very shallow surface layer area 2A shown by short slant lines in the drawing, and the solidified resin layer 1 and the foam sheet 2 are strongly bonded to each other through said area.

When such a stage is reached in around 2 seconds after start of the injection, the injection pressure is raised stepwise to 200 kg/cm$^2$. As a result, the foam sheet is further compressed by the pressure of injected resin in the contact area between the foam plate 2 and the inner wall surface of the upper die 11 and is thus progressively spread out, so that thereafter the resin can smoothly flow into said foam space and the casting of the resin over the entirety of the foam sheet is completed in about 6 seconds after start of the injection.

The flow rate of the resin into the mold during this period was about 15 mm/sec. The thus formed molten resin layer is kept to an almost uniform thickness in its entirety owing to the balance of force between the restorative force of the foam sheet 2 against the compressive deformation and the pressure possessed by the injected resin (step (e)).

In the case of this embodiment, the foam sheet 2 is compressed from 9.0 mm to 2.5 mm by being confined in the mold and is further compressed to about 0.3 mm, approximately 3.3% of its original thickness, as it receives the injection pressure of molten resin. The compression rate has reached 97%.

After filling of the space between the foam sheet and the inner wall surface of the mold with the molten resin has been completed, the injection pressure is raised to the level of 400 kg/cm$^2$ and this level of injection pressure is maintained for about 4 seconds, thereby to attain the texture stabilization of the molding resin layer and the improvement of its properties. Then, after the cooling step the completed article is withdrawn from the mold (step (f)).

The molded article taken out of the mold has the foam sheet 2 very strongly bonded to the back side of the damper body 1 made of an injection molding of a hard synthetic resin and can be offered as a finished product.

This owes to the effect of partial penetration of resin into the surface of foam sheet. That is, as already mentioned above, when the molten resin moves on in between the foam sheet and the inner wall surface of the mold, a part of said resin penetrates into the fine and complicate porous surface texture of the soft polyurethane foam sheet 2 and this state is fixed when the resin is cooled and solidified to produce a mechanical bonding effect.

In the finished damper C, the damper body 1 made of a mica-blended polypropylene resin had an almost uniform thickness of about 2.2 mm and the foam sheet 2 bonded to the back side thereof was reduced in thickness by about 2 mm and had a thickness of about 7.0 mm. This is due to the fixing of the resin-permeated portion by said bonding effect of the resin solidified in the state of being compressed by injection pressure and clamping pressure. However, the portion where no resin has permeated completely restored the properties of the original porous elastic body upon removal of compressive force.

Electron microscopical observation of the damper body 1 along its thickness showed that one side thereof constituted a mechanical bonded zone of entangled foam sheet texture and synthetic resin through a thickness of about 200 microns.

There was fear at the start of the experiment that when the injected molten resin forces its way between the foam sheet 2 and the inner wall surface of the mold, some undesirable effects might be given to the foam sheet such as the possibility of the foam sheet being shifted in the mold cavity by the pressurized resin flow or turned up or twisted at its edge or caught up in the resin flow. Such fear, however, was annulled by using the molding conditions of the present invention.

One of the key factors that enabled obtainment of the desired molded articles under such specific injection molding conditions is that the texture of the foam sheet 2 was made akin to that of the non-porous rigid body by exerting a strong compressive force while allowing the foam sheet to maintain a certain degree of compression deformability.

Another factor is that the injection pressure of molten resin is kept to a considerably lower level than used in the conventional injection molding methods, and also such injection pressure is not raised at once but adjusted stepwise, in at least two steps.

Figure 9:
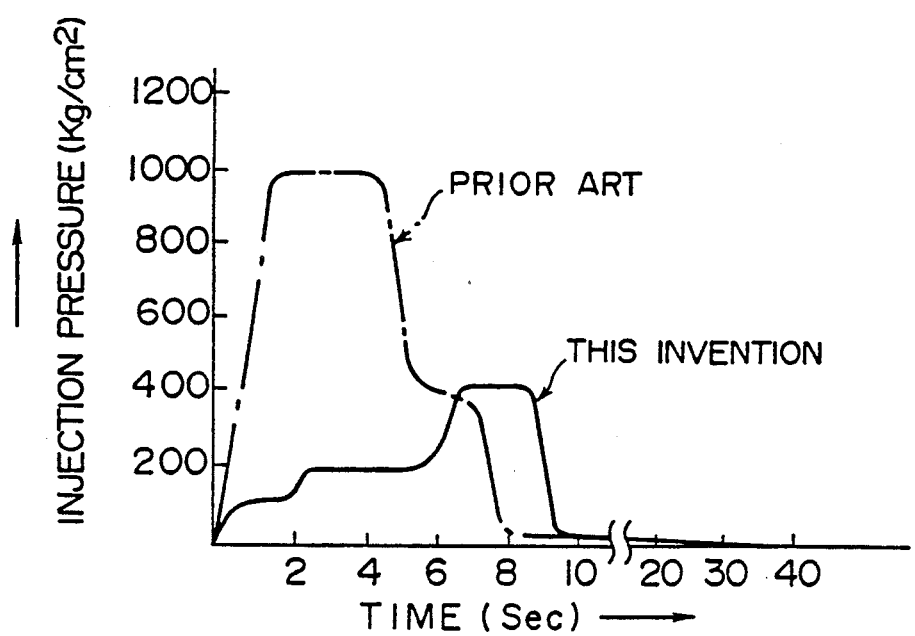
FIG. 9 is a graphical representation of the difference in injection molding conditions between the method of this invention and a conventional method.

FIG. 9 is a graph showing a comparison of the synthetic resin injecting conditions most commonly used in the conventional methods and the injecting conditions used in the present invention. It is seen that in the conventional injection molding methods, the injection step is carried out by applying an injection pressure of as high a level as 1,000 kg/cm$^2$ at once and maintaining this pressure level for a predetermined period of time.

According to the method of this invention, the highest injection pressure is controlled to a fairly low level −250 kg/cm$^2$, and this highest pressure is not applied at once but the injection pressure is applied by adjusting it stepwise, in at least two steps as mentioned above, according to the flowing condition of molten resin. After the resin injection is completed, a dwell pressure of 400 kg/cm$^2$ is maintained for a preset period of time. This method makes it possible to keep the foam sheet 2 from receiving an improper or excessive deforming or moving force. A comparision of flow rate of molten resin in a mold under such injection pressure showed that the flow rate was 50 to 200 mm/sec in the conventional injection molding methods, while it was as low as 5 to 30 mm/sec in the method of this invention.

The third factor that was conductive to the formation of desired molded articles according to the method of this invention is that the foam sheet is pressed into the mold cavity under a compressed state. This effect will be described in detail later.

FIG. 3 shows the steps in the second embodiment of this invention (first invention). The molded article D partially shown in section in FIG. 3(d) is a damper similar to that of the first embodiment.

This second embodiment differs from the first embodiment in that a thin filmy layer of a thermoplastic synthetic resin is laminated on the surface side of the porous elastic member.

In this embodiment, a soft polyurethane foam sheet 5 having a thickness of 6.0 mm and made of the same material as used in the first embodiment was prepared as the porous elastic member, and a 0.3 mm thick polypropylene film 4 was laminated as a thin filmy layer of thermoplastic synthetic resin on the surface side (opposite from the side contacting the bottom face of the mold cavity) of said foam sheet 5.

The polypropylene film 4, formed by a suitable method such as extrusion method of calendering method, may be laminated on the foam sheet 5 by heat fusion or bonding method or may be heat fused to the foam sheet coincidentally with extrusion.

As for the molding material for the damper body 1, a mica-blended polypropylene resin similar to that used in the first embodiment was selected as the thermoplastic synthetic resin of the same quality as the polypropylene resin constituting the thin filmy resin layer.

The injection mold is of a two-split structure consisting of a upper die 11 and a lower die 12. The lower die 12 is provided with a cavity 12A of a uniform depth of 2.5 mm, while the upper die 11, which is a mere flat plate, is provided with a gate 10.

For producing a damper according to this embodiment, first the foam sheet 5 is pressed into the mold cavity 12A in such a way that the bonded side of the polypropylene film 4 will be positioned on the upper side (FIG. 3(a)).

This followed by clamping by which the 6.0 mm thick laminate foam sheet 5 is pressed into the 2.5 mm deep cavity and compressed until the thickness is reduced to about 40% of the original thickness.

The mica-blended polypropylene resin which has been fused and plasticized by being heated to about 220° C. in the injection cylinder is injected toward the surface of the laminate foam sheet 5 through the gate 10 first under a low injection pressure of about 100 kg/cm$^2$.

The molten resin extruded from the gate 10 makes its way while pushing aside the foam sheet 5 positioned confronting the gate 10 and behaves in such a manner as to form an injection space, thus creating a condition in which the molten resin can smoothly flow and diffuse into the space between the bottom face of the upper die 11 and the upper side of the laminate foam sheet 5. After this stage has been reached, the injection pressure is raised stepwise to about 200 kg/cm$^2$. This allows smooth casting of resin at a low rate of about 20 mm/sec, and during this period, there is substantially no possibility of the foam sheet suffering from trouble, for example, from being shifted in the cavity by the force of resin flow or turned up or twisted at its edge or caught up in the resin flow. The reinforcement of the flexible foam sheet surface with a polypropylene film 4 of relatively high rigidity is also helpful for preventing the foam sheet 5 from being turned up at its edge or caught up in the resin flow or preventing the molten resin from getting round to the back side of the foam sheet, and the flatness of the surface of the film 4 facilitates casting of molten resin.

During the time when the injected resin flows on in the space between the polypropylene film bonded side of the laminate foam sheet 5 and the underside of the upper die 11, the foam sheet 5 is compressed to about 0.5 mm under the injection pressure, and the compression rate reaches about 90%. Such a highly compressed state is also helpful for preventing the molten resin from getting round to the back side of the foam sheet 5.

After casting of molten resin into the cavity has been completed, the injection pressure is further raised to 400 kg/cm$^2$ and kept at this level for a preset period of time to thereby attain uniformalization and stabilization of the texture of the resin layer.

The thus molded damper body 1 had an almost uniform thickness of 2.0 mm. Since the polypropylene film 4 made of the sam material as the damper body 1 is fused at its surface portion by the heat of the injected molten resin, the side of said polypropylene film contacting the damper body 1 is brought into a state of being fused together with the surface portion of the damper body. Therefore, when the damper body 1 and the propylene film 4 are cooled and solidified after a very short period of fusion, said damper body 1 and foam sheet 5 are bonded together very strongly through the polypropylene film 4. Also, since the injected molten resin is prevented from penetrating into the porous surface portion of the foam sheet 5 as the resin flow is obstructed by the layer of polypropylene film 4, the foam sheet 5 is not subjected to said fixing action in a compressed state by the infiltrated resin in the course of injection of the resin. Therefore, the foam sheet portion of the molded article withdrawn from the mold maintains almost the same thickness as before molding, and also the foam sheet suffers from substantially no deterioration of properties.

FIG. 4 is a side elevation of a damper E manufactured as the third embodiment of the invention (part of the first invention). It will be seen that a damper swinging arm 30 provided with a pivotal shaft 31 is integrally molded with the arcuately curved plate-like damper body 1D. The foam sheet 5 having a filmy layer of synthetic resin 4 laminated thereon is bonded to the external side of the circular arc of the damper body 1D. In this embodiment, an ordinary injection mold capable of forming the arm 30 is used as top force. In the drawing, 30A indicates reinforcing ribs, and 10A shows the remains of the resin injection port.

Now, the embodiments of the second invention will be described.

FIG. 5 shows the steps for making a damper adaptable in an air conditioner for automobiles, illustrating the fourth embodiment of the invention (an embodiment of the second invention).

The damper F sectionally shown in FIG. 5(f) has a structure in which the foam sheets 2 and 3 made of soft polyurethane foam or the like are bonded as porous elastic member to both front and rear sides of the damper body 1 made of a hard synthetic resin plate, as opposed to the first invention in which the foam sheet is bonded to one side alone of the damper body.

The process for making such damper F comprises principally the step of cutting out foam sheets of desired dimensions from a stock blank and trimming them, the step of placing said foam sheets one on the other and forcing them into the injection mold in a compressed state, and the step of injecting a molten synthetic resin into the space between said two foam sheets in a compressed state an letting the injected resin spread over the entirety of said space.

In this embodiment, the hard synthetic resin 1 for injection molding and the two foam sheets 2 and 3 are of the same material and the same dimensions as those used in the first embodiment.

The injection mold shown in FIG. 5(a) consists of a upper die 11 and a lower die 12, the upper die being provided with a cavity 11A and the lower die with a cavity 12A, both of said cavities being 2.2 mm in depth and equal in plane area to the foam sheets 2, 3. A direct gate 10 is incorporated in the upper die 11 in such a manner that the end (face) of said gate 10 projects downwardly from the split surface as shown in the drawing and will slightly get into the cavity 12A of the lower die. The upper foam sheet 2 is also formed with a hole 2A that allows passage of said protuberant gate end therethrough.

FIG. 5(b) shows the step in which the two foam sheets 2 and 3, placed one on the other, are properly positioned in the cavity 12A of the lower die.

Then, as shown in FIG. 5(c), the top and bottom forces 11 and 12 of the split mold are held between a clamping sheet 21 and a movable sheet 22 and clamped by a ram (not shown), whereby the two foam sheets 2 and 3 are perfectly pressed into the cavities 11A and 12A, respectively, and thus compressed to about 25% of the original thickness.

Under this state, the protuberant end of the gate 10 slightly wedges into the surface of the lower foam sheet 3, so that the lower foam sheet 3 is locally pressed downwards and dented annularly around the gate 10 as seen from an enlarged view of the encircled portion in the drawing. Accordingly, the corresponding bottom side portion of the upper foam sheet 2 swells out in a way to fill up the space formed by said deformation of the lower foam sheet 3. Since the compressive force of clamping given to the foam sheet 2 is mitigated at said swollen-out portion, an annular compression reducing zone A substantially wedge-shaped outwardly in section is formed by itself at a part on the lower side of the foam plate 2 surrounding the gate 10.

The process then proceeds to the synthetic resin injection step shown in FIG. 5(d). The mica-blended polypropylene resin which has been melted and plasticized by being heated to about 220° C. in the injection cylinder 25 is injected toward the gate 10 through a nozzle 24 first under a pressure of about 100 kg/cm². This injected resin pushes aside the foam sheet positioned confronting the end face of the gate 10 and forces its way between the two foam sheets 2 and 3 while forming a flow passage.

The molten resin which has reached the compression reducing zone A at the periphery of the gate 10 behaves in the manner of spreading out said wedge-shaped portion with the pressure it possesses, thus creating a condition favorable for the molten resin to be forced into and flow on between the two foam sheets. When this stage has been reached after about 2 seconds from start of injection, the injection pressure is adjusted stepwise to 200 kg/cm², whereby the space between the facing surfaces of the two foam plates 2, 3 is progressively spread out as the foam plates are further compressed by the pressure of the injected resin, so that thereafter the resin is allowed to smoothly flow into the space between the foam sheets and casting of the resin along the full length of foam sheet is completed in about 6 seconds after start of injection.

The flow rate of resin during this period was about 15 mm/sec. The thus formed layer of molten resin is kept to an almost uniform thickness along its full length due to the balance of force between the restorative force acting against the compressive deformation of the foam sheets 2 and 3 and the pressure possessed by the injected resin (step (e)).

In the case of this embodiment, the foam sheets 2 and 3 were compressed from 9.0 mm to 2.2 mm by being stuffed up in the mold, and they were further compressed under the injection pressure of molten resin to about 0.3 mm, corresponding to about 3.3% of the original thickness, the compression rate reaching 97%.

After casting of molten resin into the space between the two foam sheets has been ended, the injection pressure is raised to the level of 400 kg/cm² and kept at this level for about 4 seconds to attain stabilization of the texture of the injected molding resin layer and improvement of its properties. Then, after the cooling step, the molded article is withdrawn from the mold (step (f)). In this molded article, the foam sheets 2, 3 are very strongly bonded to both front and rear sides of the damper body 1 which is a molded piece of hard synthetic resin, and this molded article can be offered as a finished damper.

In the finished damper F, the damper body 1 made of a mica-blended polypropylene resin had an almost uniform thickness of about 3.8 mm, and each of the foam sheets 2, 3 bonded to both sides of said damper body was reduced in thickness by about 2 mm and had a thickness of about 7.0 mm.

At the start of the experiment, it was feared that when the injected molten resin forces its way between the two foam sheets 2 and 3, there might occur some undesirable phenomena on the foam sheets, such that the foam sheets may be shifted in the mold cavity by the force of the pressurized resin flow or turned up at the edges or caught up in the resin flow, but the occurrence of such undesirable phenomena could be avoided by adopting the specific molding conditions of the present invention.

As the main factors that have enabled obtainment of the desired molded article under such specific injection molding conditions, the first and second factors mentioned in the explanation of the first invention may be referred to. It is also pointed out as the third factor that the foam sheets 2 and 3 are pressed into the mold cavity in a compressed state. The effect of compression of the foam sheets is described below with reference to FIG. 10.

Figure 10:
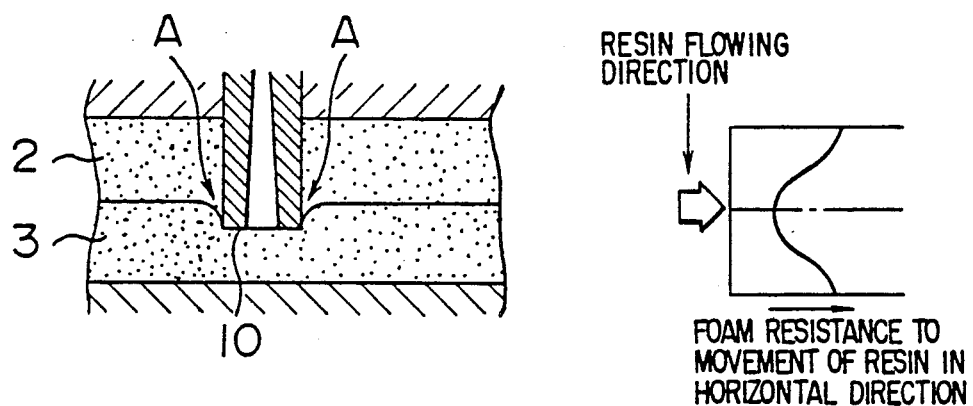
FIGS. 10 and 11 are diagrammatic graphs illustrating the manner in which the foam sheet in a compressed state in the mold endures the moving force and deforming action given by the pressurized resin flowing in the mold in the processes of the first and second inventions of this application, and enlarged views of the gate and its neighborhood.

FIG. 10 is a graph showing diagrammatically the resistance (moving resistance) given to the flow of pressurized molten resin by the foam sheets 2, 3 compressed in the mold cavity (the diagram being based on the actual measurements). Both foam sheets 2 and 3 are uniformly compressed in the mold, but since they are strongly pressed against the bottom surface of the cavity by compression, a large frictional force develops at both end faces in the thicknesswise direction. Therefore, the force resisting the movement of resin flow urging the foam sheets in the direction of resin flow (horizontal direction) is the greatest at both end faces and diminished gradually toward the center of foam sheet. Since the molten resin advances in the direction of sheet surface along the central part of foam sheet in its thicknesswise direction, the resin can spread in the space between the two foam sheets while widening it out relatively, and it hardly becomes possible that the resin is removed against the frictional force of contact with the wall surface of mold cavity by the injection pressure.

FIG. 6 illustrates the fifth embodiment relating to the second invention. In the molded article G of this embodiment, as seen from a sectional view of the article shown in FIG. 6(d), cutouts 2B, 3B are provided in the foam sheets 2, 3 bonded integrally to both surfaces of the damper body 1 so that the damper body 1 is bared out at the parts which needn't be bonded to the foam sheets. This embodiment differs from the fourth embodiment in that said cutouts are provided.

In this embodiment, therefore, the upper and lower dies 11, 12 of the injection mold are provided with the protuberances 11B, 12B for preventing the molten resin from flowing into said cutouts (see FIG. 6(a)).

The presence of such resin flow obstructive protuberances in the mold cavity can more positively inhibit uniform flow of molten resin in between the two foam sheets. Said protuberances 11B, 12B are so designed that, like the gate 10, the end faces thereof won't be flush with the plane of contact of the two foam sheets 2, 3 but each protuberance will slightly wedge into the contacting foam plate so that a compression reducing zone A cross-sectional wedge-shaped zone will be formed by itself in the surface of foam sheet surrounding the end of the protuberance as in the case of gate 10 (see FIG. 6(b)).

According to such mold construction, as illustrated in FIG. 6(c), the molten resin 1 which is injected from the gate 10 into the compression reducing zone A at the interface of the two foam sheets 2, 3 as in the case of the fourth embodiment impinges against the protuberance 11B or 12B positioned in the way of resin flow and flows into the compression reducing zone A where the resistance to advancing resin flow is relatively low, and as the resin flows into and advances in the compression reducing zone A encompassing the protuberance, it can easily reach the position past said protuberance. And owing to said effect of presence of the compression reducing zone A, spreading of the molten resin in the area around the protuberance is promoted and the foam sheets are prevented from being shifted or deformed.

FIG. 7 illustrates the sixth embodiment relating to the second invention. This embodiment concerns the manufacture of an injection molded article having a complicated structure involving parts crossing each other, for example, a damper having a T-shaped cross-section shown in FIG. 7, molding of which is impossible or very difficult with the stamping molding method described before.

The damper H shown sectionally in FIG. 7(c) has an angular plate-like configuration. A wind direction deflector 1C is provided integrally with and projecting vertically from a middle part of one surface of the damper body 1A which has at an end thereof an integral damper pivotal shaft 1B, and the foam sheets 2, 3 are bonded to both sides of the damper body 1A and to one side of said wind direction deflector 1C as shown in the drawing.

In this embodiment is employed a method in which multiplepoint pin gates (three gates 10 in this embodiment) are incorporated in the mold. Accordingly, the foam sheet 2 disposed on the upper side is formed with three holes 2A for passing the respective gates 10. The foam sheet 3 disposed on the lower side has its central part blanked in U-shape, the raised-up portion being bent downwardly at a right angle (90°) and bonded to one side of the wind direction deflector 1C (see FIG. 7(a)).

The injection mold, as shown in FIG. 7(b), has a three-split structure consisting of a flat plate-like upper die 13 and a pair of inverted L-shaped lower dies 14 and 15. The molding cavities for the damper body 1A and the pivotal shaft 1B are formed in the upper surfaces of the upper die 13 and a pair of lower dies 14, 15, and a molding cavity for the wind direction deflector 1C is formed between the vertical portions of said pair of lower dies 14, 15.

The two foam sheets 2 and 3, cut and bent into the shapes shown in FIG. 7(a) are rightly positioned in the mold cavities in a state where the spaces between the respective splits 13–15 are properly opened, and then the mold is claimed to bring them into the state shown in FIG. 7(b). In the drawing, numeral 26 indicates a sprue and 27 a runner. One of the three gates 10 is disposed adjacent to the joint section of the damper body 1 and the wind direction deflector 1C.

Since the process for integral injection molding with the foam sheets in this embodiment is substantially the same as those of the preceding embodiments, the explanation of such process is saved here.

FIG. 8 is a side view of a damper I obtained according to the seventh embodiment of the invention (second invention). This damper consists of a doglegged plate-like damper 1E and a flat plate-like damper 1F bonded to each other as shown in the drawing and thus has a more complicated three-dimensional structure. 40 indicates a damper swing arm provided with a pivotal shaft 41, and 40A designates reinforcing ribs. A three-split mold is used in this embodiment, and the foam sheets 5 are bonded to both sides of the damper body similarly to the fourth to sixth embodiments.

Figure 11:
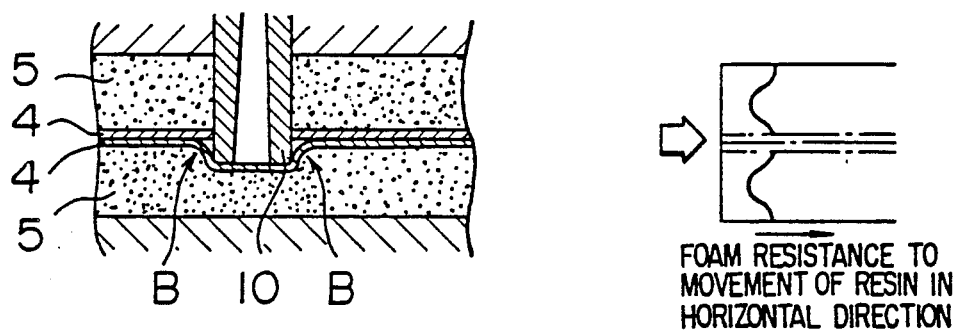

FIG. 11 shows a diagrammatic graph similar to FIG. 10, illustrating the resistance to the resin flow by the foam sheets in case of making a damper according to the same method as the fourth embodiment of the second invention by using two foam sheets 5 each having a polypropylene film 4 laminated on the surface thereof.

In this embodiment, unlike the case where the foam sheet has no synthetic resin filmy layer, the two foam sheets 5 provide a large resistance to movement of resin in the direction of plate surface due to the film reinforcing effect by the presence of polypropylene film as a non-porous material layer. Thus, the two foam sheets 5 show a high resistance to movement of resin at the face contacting the mold wall and at the face contacting the casting zone of injected molten resin, and this proves effective for preventing the foam sheets from being shifted or deformed in the course of injection of resin.

Also, as seen from an enlarged view of the gate and its neighborhood on the left side of FIG. 11, the end of the gate 10 is slightly pressed into the lower laminate foam sheet 5, whereby an annular space B substantially wedge-shaped in cross-section is formed by itself surrounding the gate 10.

This space B, like the compression reducing zone A described before, can effectively play the role of expediting the smooth flow of molten resin. The size of the space B is variable according to the depth of thrust of the gate end into the foam sheet and the material and thickness of the synthetic resin layer 4, so that in some cases, depending on these conditions, the space B may be scarcely formed.

In the embodiments described above, polypropylene resin has been used as injection molding resin, but it is of course possible to use all other types of thermoplastic synthetic resins capable of injection molding. It is further possible where necessary to use thermosetting synthetic resins having injection moldability or synthetic resins or elastomers having reactive curing properties.

As the porous member, there can be used, in addition to soft polyurethane foam mentioned above, the foams of various kinds of soft synthetic resins or elastomers such as polyether type polyurethane, polyethylene, ethylene-vinyl acetate copolymer, vinyl chloride, etc., and various kinds of synthetic rubber.

As for the desired property values of the foams suited for use in this invention, it was determined as a result of many tests that the foaming ratio should be 10 to 60 times, preferably 20 to 50 times, and the cell size should be in the range of 250 to 1,500μ, preferably 300 to 1,000μ.

When the foaming ratio and cell size are below the above-defined ranges, the permeation of injected molten resin into the surface portion of the foam becomes insufficient particularly in case the foam has no resin layer on its surface, and no satisfactory bonding can be effected between the foam and the injected molten resin. On the other hand, when the foaming ratio and cell size exceed the above-defined ranges, the molten resin permeates too much, increasing the degree to which the foam is fixed in a compressed state by the infiltrated resin, resulting in a marked decrease of effective thickness of the foam when the molded article is withdrawn from the mold.

Also, since the respective types of foams have their specific heat resistance and compression characteristics, it is necessary to select a foam of the proper type according to the change of resin injection temperature by the use of different kinds of injection molding resin.

The porous elastic member used in this invention may not necessarily be a plate-like member made of a single material; it may be a laminate of different types of foams or a bonded combination of a foam with an agglomerate of fibrous material. Also, it may have a three-dimensional configuration according to the purpose of use of the molded article.

The thermoplastic synthetic resin used for forming a thin resin layer on the surface of the porous elastic member is preferably the same as the injecting molding resin, but any resins showing a compatibility with the injection molding resin when melted are also usable.

The thickness of the thin resin layer is defined within the range of 0.2 to 1.0 mm, preferably 0.3 to 0.5 mm, as this range of thickness is best suited for the resin layer to perform its intended role in a state of being laminated on the porous elastic member without affecting the excellent flexibility of the elastic member.

The molding conditions in conducting integral injection molding with the porous elastic member are also variable depending on the properties of the injection molding resin and of the porous elastic member used, but it is desirable that the compression rate (rate of decrease of thickness by compression) of the porous elastic member compressed by the injected resin pressure be defined within the range of 50 to 98%. If the compression rate exceeds this range, no satisfactory infiltration of the resin into the porous elastic member will be effected, resulting in a poor bond to the injection molding. A lower compression rate than the above-defined range may become a cause of excessive permeation of molten resin into the foam surface portion, resulting in an increased degree of foam sheet thickness reduction.

Regarding the injection pressure, it is to be noted that the conventional injection molding pressure in the conventional methods is set at a fairly high level of 600–1,500 kg/cm$^2$ and accordingly the flow rate of molten resin in the mold is as fast as 50–200 mm/sec, whereas according to the injection molding method of this invention, the injection pressure is controlled to a very low level of 250 kg/cm$^2$ at its peak. Further, as opposed to the conventional methods in which the injection pressure is maintained at a constant level from start to end of injection, the injection molding in the method of this invention is started with as low an injection pressure as 30 kg/cm$^2$, and as already stated, the injection pressure is adjusted stepwise, in at least two steps, according to the situation of casting of resin into the mold. This enables smooth injection of resin into the specific injection space in the mold used in this invention.

If the injection pressure is below the defined range of 30 to 250 kg/cm$^2$, the resin is little infiltrated into the surface portion of the porous elastic member, while if the injection pressure exceeds said range, the resin is permeated excessively to give rise to troubles such as mentioned above.

As regards the dwell pressure which is kept applied for a given period of time after completion of injection, a pressure not lower than 300 kg/cm$^2$ is necessary as in the case of ordinary injection molding, but a pressure exceeding 500 kg/cm$^2$ may cause internal strains or formation of burrs due to overcharging.

While the present invention has been described concerning its embodiments as applied to molding of an air duct opening/closing damper having bonded thereto a foam sheet (or foam sheets) designed to serve as airtight seal and buffer, it will be understood that it is possible according to the method of this invention to produce not only the articles having a simple flat configuration such as dampers but also various kinds of functional parts having a complicated three-dimensional configuration and non-uniform in thickness of foam sheet(s) and/or injection molded portion.

What is claimed is:

1. A method of producing a synthetic resin made article having a porous elastic member by injection molding, comprising the steps of:

placing a porous elastic member in position against an inner wall surface of one of opposing segments of an injection mold splittable into two or more segments;

closing said injection mold and compressing said porous elastic member by clamping pressure;

injection under pressure a molten synthetic molding resin into the injection mold between an inner wall surface of one of the opposing segments and a surface of said porous elastic member and, thereby, forcing synthetic molding resin between the surface of said porous elastic member and the inner wall surface of another opposing segment of the injection mold; and applying a dwell pressure of a preset level of 300 to 500 kg/cm$^2$ for a prescribed period of time to the synthetic molding resin injected into said mold, wherein the injection pressure is applied to the injected resin continuously and is increased in at least two steps from a lower level of pressure of 30 kg/cm$^2$ to a higher level of pressure of 250 kg/cm$^2$.

2. The method according to claim 1, wherein said porous elastic member, after being compressed by clamping pressure, is further compressed by injection molding resin pressure in said mold until the thickness of said member is reduced to 50 to 98% of the original thickness.

3. The method according to claim 1 wherein said porous elastic member is a soft synthetic resin foam.

4. The method according to claim 1, wherein a thin film of a thermoplastic synthetic resin is laminated on the side of said porous elastic member where the synthetic resin is injected prior to placing said porous elastic member into one of the opposing segments of the mold.

5. A method of producing a synthetic resin made article having porous elastic members, which comprises the steps of:

placing two porous elastic members in position against inner wall surfaces of each pair of opposing segments of an injection mold splittable into two or more segments;

closing said injection mold and compressing said two porous elastic members by said clamping pressure while a protuberant end of a gate provided in the mold is thrust into said elastic members so that said protuberant gate end will pass through one of the two porous elastic members and slightly wedge into the surface of the other elastic member, injecting under pressure a molten synthetic molding resin into the injection mold into a space between the two porous elastic members in a compressed state and letting the injected resin spread over the entire space and along said opposing faces of said two porous elastic members and wherein the injection pressure is applied to the injected resin continuously and is increased in at least two steps from a lower level of pressure of 30 kg/cm$^2$ to a higher level of pressure of 250 kg/cm$^2$; and applying a dwell pressure of preset level of 300 to 500 kg/cm$^2$, for a prescribed period of time, to synthetic molding resin injected into said mold.

6. The method according to claim 5, wherein said two porous elastic members, after being compressed by clamping pressure, are further compressed by said injected resin pressure in said mold until the thickness of said members is reduced to 50 to 98% of the original thickness.

7. The method according to claim 5 wherein said porous elastic members are a soft synthetic resin foam.

8. The method according to claim 5, wherein a thin film of a thermoplastic synthetic resin is laminated on the opposing sides of said two porous elastic members prior to placing said two porous elastic members same into opposing segments of the mold.

* * * * *